Oct. 21, 1941.　　　K. BAKE　　　2,259,969
BROACHING TOOL
Filed Jan. 18, 1940
Fig. 1
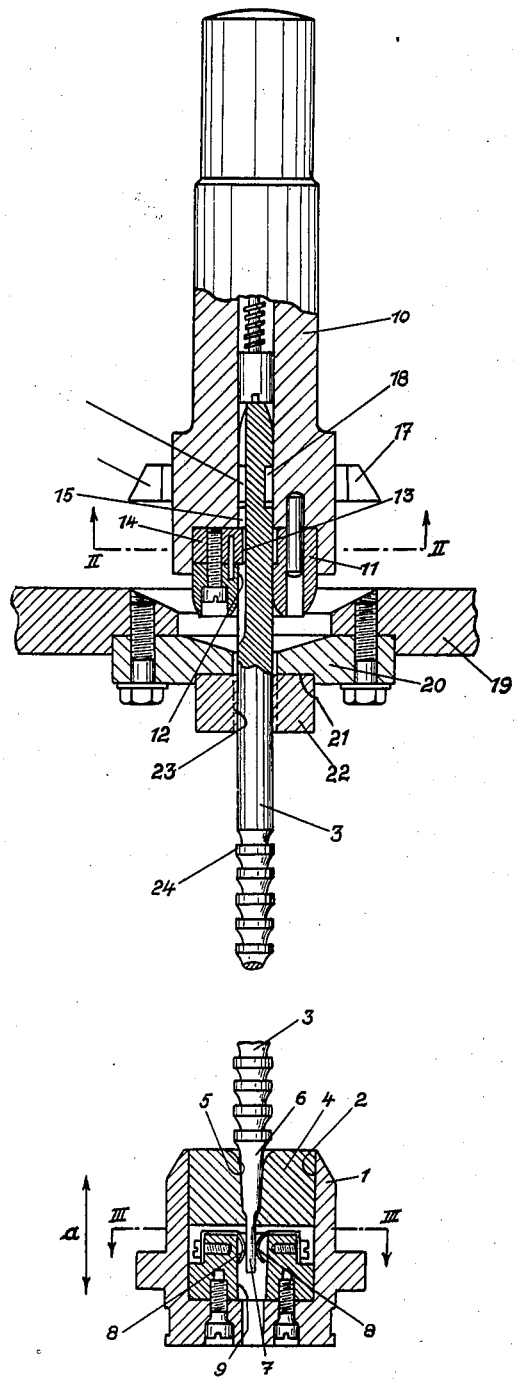
Fig. 2
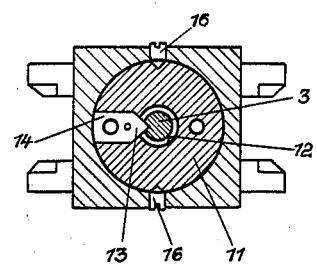
Fig. 3
Inventor:
KURT BAKE
BY: *Richards & Geier*
Attorneys Patented Oct. 21, 1941

2,259,969

UNITED STATES PATENT OFFICE 2,259,969

BROACHING TOOL

Kurt Bake, Zerbst, Anhalt, Germany, assignor to Junkers Flugzeug-und-Motorenwerke, A. G., Dessau, Dessau, Germany, a corporation of Germany Application January 18, 1940, Serial No. 314,419
In Germany December 13, 1938

3 Claims. (Cl. 90—33)

This invention relates to broaching machines and refers more particularly to a device for guiding and holding the broaching tool of such machines.

Broaching machines comprise usually a broaching tool or a broaching needle, which is held by a movable tool feeder and an end of which is moved by this feeder through an opening in the workpiece until it is received by a tool receiver which pulls the tool through the workpiece and causes the scraping edges of the tool to carry out the required operation.

An object of the present invention is to provide a broaching machine of this type which is so constructed that the scraping edges of the broaching tool are maintained in a predetermined angular relationship to the workpiece in the course of the entire movement of the tool through the workpiece.

Another object is the provision of a simple and effective operating means for firmly holding a broaching tool in the course of its movement through a workpiece from a tool feeder to a receiver.

Other objects of the present invention will become apparent in the course of the following specification.

The objects of the present invention may be realized through the provision of means provided in the tool feeder as well as the tool receiver, which lock the broaching tool in a perpendicular plane in such manner that it occupies in the course of its movement a predetermined cross-sectional position relatively to the workpiece which is also secured against turning in relation to the tool receiver.

The invention will appear more clearly from the following detailed description when taken in connection with the accompanying drawing showing, by way of example, a preferred embodiment of the inventive idea.

In the drawing:

Figure 1 is a longitudinal section through a device constructed in accordance with the principles of the present invention, some parts being shown in side elevation;

Figure 2 is a cross-section along the line II—II of Figure 1; and

Figure 3 is a cross-section along the line III—III of Figure 1.

The device shown in the drawing constitutes a part of a broaching machine the frame of which is not illustrated. This frame is connected with the tool feeder or head 1 in such manner that the feeder 1 can move up and down, as indicated by the arrows $a$ in Figure 1.

The feeder 1 carries the broaching tool or broaching needle 3. The feeder 1 is hollow and its inner cavity 2 contains a sleeve 4 provided with inner conical surfaces 5, constituting a conical bore hole which may receive the end surfaces 6 of the tool 3. The tool 3 and the sleeve 4 are so constructed that the tool 3 is supported by the tool feeder 1 when the end surfaces 6 of the tool are in engagement with the conical surfaces 5 of the sleeve 4.

The tool 3 is provided with an end 7 which is substantially flat and rectangular in cross-section, as shown in Figure 3, and which is situated at a distance from the end surfaces 6. The parallel flat surfaces of the end 7 extend at a predetermined radial angle to the operative scraping edges 24 of the tool 3.

Two wide leaf springs 8 are situated below the sleeve 4 in a cavity 9 provided within the tool feeder 1. The springs 8 are located opposite each other and are held by bolts carried by another sleeve which is situated within the tool feeder 1 and is screwed thereto. The distance between adjacent ends of the springs 8 is such that the springs 8 can receive the end 7 and hold it firmly while the tool 3 is moved by the tool feeder 1 in the directions of the arrow $a$ (Figures 1 and 3).

The tool receiver 10 is situated above the tool feeder 1 and is coaxial therewith. The receiver 10 is so connected with the machine frame that it can also move vertically in the directions of the arrow $a$. That end of the receiver 10 which is situated close to the feeder 1 carries an insert or sleeve 11 which is connected by pins or other suitable means to the receiver 10. The sleeve 11 is provided with a central conical bore hole 12 which has the form of a trough so that it can receive conveniently an end of the tool 3.

As shown in Figures 1 and 2, a tight fitting spring 14 is connected by a bolt with the sleeve 11 and has a projecting end 13 which is situated within the bore hole 12.

When the tool 3 is situated in the position shown in Figure 1, the end 13 of the spring 14 projects into a longitudinal groove 15 which is provided in the upper end of the tool 3. The radial cross-sectional angle between the groove 15 and the flat surfaces of the lower end 7 of the tool 3 should be equal to the angle between a tool engaging surface of a spring 8 in the tool feeder 1 and the end 13 of the spring 14 provided in the tool receiver 10.

The tool receiver 10 carries adjusting screws 16 (Figure 2) which are used to maintain the sleeve 11 and the spring 14 carried thereby in the required position relatively to the tool holder 10. This position is such that the guiding means 8 for the lower end 7 of the tool 3 in the feeder 1 corresponds circumferentially to the position of the guiding means 13 in the receiver 10, and that, therefore, no turning of the tool 3 can take place when the tool is moved from the feeder to the receiver.

Two locking bars 17 are used to hold the tool 3 in the receiver 10 (Figure 1). The bars 17 are movably mounted in suitable openings provided in the receiver 10 and are operated by springs which are not shown in the drawing. In the locking position shown in Figure 1, the bars project into corresponding cavities 18 provided in the tool 3. A removable and replaceable support 20 is screwed by bolts to a plate 19 constituting a part of the machine frame and is located between the tool feeder 1 and the tool holder 10. The support 20 is used for holding the workpiece 22 and is provided with a cut out portion 21, the outline of which should correspond exactly to the outline of the workpiece 22, so that the workpiece 22 fits into the cut out portion 21. Thus the workpiece 22 is prevented from turning and is firmly held in a predetermined position relatively to the support 20. Consequently, the position of the support 20 is precisely determined relatively to the machine frame, the feeder 1, the receiver 10, as well as the tool 3.

The device is operated as follows:

The tool feeder 1 which carries the tool 3 is moved upwardly and introduces the upper end of the tool 3 into the opening 23 which has been previously formed in the workpiece 22. The upper end of the tool 3 is moved through the workpiece 22 and is introduced into the trough-like opening 12 of the sleeve 11 carried by the tool receiver 10.

In the course of this movement, the springs 8 maintain the tool 3 in the required predetermined position relatively to the feeder 1. As already stated, the position of the springs 8 corresponds exactly to the position of the spring 14 carried by the sleeve 11 in relation to the tool receiver 10, and the flat surfaces of the end 7 are correspondingly located, so that no turning of the tool can take place during this movement. Therefore, during the penetration of the upper end of the tool 3 into the receiver 10, the projecting end 13 of the spring 14 is introduced into the groove 15 of the tool 3. Due to this arrangement, the scraping edges 24 of the tool 3 are maintained in an exactly predeterminable circumferential position relatively to the workpiece 22.

The introduction of the tool 3 into the receiver 10 is terminated when the two locking bars 17 are moved into the recesses 18 of the tool under the action of springs which are not shown in the drawing. Then the tool 3 is held firmly by the tool receiver 10 so that the scraping operation can begin.

Simultaneously, the lower end 6 of the tool 3 is pulled out of the tool feeder 1, so that the tool 3 is then held solely by the tool receiver 10. Then the tool receiver 10 pulls the tool 3 through the workpiece 22 causing the scraping edges 24 to carry out their work. Then the workpiece 22 is removed and the bars 17 are moved outwardly, freeing the tool 3, which drops out of the holder 10. The lower end 6 of the tool 3 is received in the conical opening 5 of the sleeve 4 which is carried by the tool feeder 1.

The springs 8 are so disposed in relation to the sleeve surfaces 5, and the tool surfaces 6 are so arranged relatively to the end 7 of the tool, that the flat end 7 of the tool 3 comes into engagement with the springs 8 before the surfaces 6 of the tool are engaged by the surfaces 5 of the sleeve 4. Due to this arrangement, the tool 3 turns, if necessary, to assume its proper position within the feeder 1 before it is brought to rest in the conical opening 5. The tool 3 is thus caused to occupy the required position, so that in the course of the next operation, the end 13 of the spring 14 is situated precisely in the path of the groove 15 of the tool.

As has been already stated, the support 20 is a replaceable one and is carried by the plate 19 of the machine frame. That side of the support 20 which faces the feeder 1 is provided with a cut-out portion 21, the outline of which corresponds exactly to the outline of the workpiece 22. The workpiece 22 is fitted into the cut-out portion 21 and is held therein by hand by the operator until the tool 3 is moved by the feeder 1 through the hole of the workpiece 22, the support 20, and the plate 19, and until the tool 3 is held by the receiver 10. Then the operator can release his hold upon the workpiece 22, since the upward movement of the tool 3 will hold the workpiece 22 in its position within the cut-out portion 21 until the operation is completed. Shortly before the completion of the operation, the operator should grip again the workpiece 22 until the last scraping edges of the tool have moved beyond the hole of the workpiece. Then the workpiece is removed by the operator. Thereupon the tool 3 is freed, so that it will drop out of the holder 10 and into the feeder 1. The operator inserts a new workpiece into the cut-out portion 21, and then the operation can be repeated.

It is apparent that due to the described arrangement, the operative profile of the tool 3 occupies the same predetermined cross-sectional position in relation to the workpiece 22 during the entire operation of the machine. The teeth or scraping edges 24 remove shavings, the positions of which relatively to the form of the workpiece 22 are exactly determined.

This device is particularly advantageous when several workpieces are to be subjected to the same scraping operation, since all the surfaces treated by the scraping edges will occupy the same positions.

It is apparent that the specific illustrations shown above and the terms and expressions employed herein have been used by way of illustration and not by way of limitation and that the structures above described are subject to wide variation and modification without departing from the scope or intent of the invention, all of which variations and modifications are to be included within the scope of the present invention.

What is claimed is:

1. In a broaching machine, in combination with a movable tool feeder and a tool receiver; a broaching tool movable along with said tool feeder relatively to a workpiece, and means for preventing the workpiece from turning relatively to the tool receiver, said tool feeder having resilient tool-engaging means, said tool receiver comprising tool holding means, said broaching tool comprising a substantially flat end engaged by the resilient tool-engaging means of said tool feeder and another portion engaged by the tool holding means of said tool receiver to maintain the tool in a predetermined cross-sectional position relatively to the workpiece.

2. In a broaching machine, in combination with a movable tool feeder and a tool receiver; a broaching tool having an end surface, and movable along with said tool feeder relatively to a workpiece, and means for preventing the workpiece from turning relatively to the tool receiver, said tool feeder having resilient tool-engaging means and means spaced therefrom and constituting a support for an end surface of the tool; said tool receiver comprising tool holding means, said broaching tool comprising a substantially flat end spaced from said end surface to cause the resilient tool-engaging means to engage said flat end before said end surface is engaged by said support, said tool also having a portion engaged by the tool holding means of said tool receiver to maintain the tool in a predetermined cross-section position relatively to the workpiece.

3. In a broaching machine, in combination, with a movable tool feeder and a tool receiver; a broaching tool movable along with said tool feeder relatively to a workpiece, and means for preventing the workpiece from turning relatively to the tool receiver, said tool feeder and said tool receiver comprising tool holding means, said broaching tool comprising a substantially flat end engaged by the tool holding means of said tool feeder, said broaching tool also having a guiding groove formed therein which is engaged by the tool holding means of said tool receiver, the radial angle between said guiding groove and said flat end being substantially equal to the radial angle between the tool holding means of said tool feeder and the tool holding means of said tool receiver.

KURT BAKE.